United States Patent [19]

Stravitz

[11] Patent Number: 4,512,468
[45] Date of Patent: Apr. 23, 1985

[54] CASSETTE STORAGE DEVICE

[75] Inventor: David M. Stravitz, New York, N.Y.

[73] Assignee: Lebo/Peerless Corp., Bloomfield, N.J.

[21] Appl. No.: 444,795

[22] Filed: Nov. 26, 1982

[51] Int. Cl.³ .......................................... B65D 85/672
[52] U.S. Cl. .................................. 206/387; 206/564; 312/8
[58] Field of Search ............... 206/45.14, 45.19, 387, 206/559, 560, 562, 564; 211/40; 312/8, 9, 10

[56] References Cited

U.S. PATENT DOCUMENTS

| 3,640,379 | 2/1972 | Weingarden | 206/387 |
| 3,743,081 | 7/1973 | Roberg et al. | 206/387 |
| 3,743,374 | 7/1973 | Glass | 206/387 |
| 3,836,222 | 9/1974 | Kuntze | 206/387 |
| 4,241,859 | 12/1980 | Eames | 206/387 |
| 4,330,161 | 5/1982 | Khawund | 312/9 |

OTHER PUBLICATIONS

"Dynasound Cassette Case" Box Lid with Picture Showing a Cassette Case.

Primary Examiner—George E. Lowrance
Assistant Examiner—Jimmy G. Foster
Attorney, Agent, or Firm—Robin Blecker & Daley

[57] ABSTRACT

Cassette storage devices are provided for storing a plurality of cassettes in respective cassette cases which have a base and a door movably connected to the base, the base having upstanding side portions and the door extending between the upstanding side portions of the base. The storage device comprises at least one receptacle for receiving a respective cassette case, and engagement means at peripheral portions of the receptacles for frictionally engaging the base portion of a respective received cassette case without substantially blocking the openable door so as not to interfere with opening of the cassette case door. In the devices of the invention, the doors of the cassette case can be opened relative to the base portion while the respective cassette case is, and remains, engaged in the respective receptacle of the storage device. Preferably, the storage device has a plurality of receptacles adjacent each other and/or in back-to-back relationship. Various engagement means are disclosed for retaining the cassette cases in position, while permitting opening of the door of the cassette case and while also permitting viewing of the contents of the cassette case.

14 Claims, 23 Drawing Figures

CASSETTE STORAGE DEVICE

BACKGROUND OF THE INVENTION

This invention relates to cassette storage devices, and more particularly to storage devices for storing audio tape cassette cases of the Norelco or Phillips types, generally designated as "compact cassettes".

An object of the present invention is to provide compact cassette storage devices which are relatively easy to manufacture, small in size and which retain a plurality of compact cassettes in a compact arrangement.

A further object of the invention is to provide compact cassette storage devices which retain the compact cassette cases in such a manner that the cases may be opened while they are retained in the storage device to remove the cassette tape therefrom.

Yet another object of the invention is to provide such a storage device for use with a sun visor of an automobile, and which prevents compact cassette cases from inadvertently opening and releasing their contents during use of the vehicle.

Yet another object of the invention is to provide such tape cassette storage devices which retain tape cassette cases in generally the form of a "book" so that the storage device with its tape cassettes mounted therein may be stored on, for example a bookshelf, the titles of the cassettes being visible at positions generally taken by the binding of a book.

SUMMARY OF THE INVENTION

According to one aspect of the invention, a cassette storage device is provided for storing at least one cassette in respective cassette cases having a base and door movably connected to the base, the base having upstanding side portions and the door extending between the upstanding side portions of the base. The cassette storage device comprises means defining at least one receptacle for receiving a respective cassette case; and engagement means at peripheral portions of the receptacles for frictionally engaging the base portion of a respective cassette case without substantially blocking the openable door of the respective engaged cassette case, whereby the door of the case can be opened relative to the base portion while the respective cassette case is, and remains, engaged in the respective receptacle of the storage device.

According to a further aspect of the invention, the cassette storage device comprises projections extending over the upper edge of the upstanding walls of the base of the cassette case to provide more positive engagement between the base and the engagement means. According to yet another aspect of the invention, projections are provided at the ends of the cassette storage device for engaging end walls of the base of the cassette case, substantially without engaging the openable door.

According to a further aspect of the invention, the storage device comprises means for limiting the movement or degree of opening of the door when removing cassettes from the cassette cases.

According to yet another aspect of the invention, cassette storage devices are either connectable together back-to-back or end-to-end, to provide more flexibility of use. Still further, according to other aspects of the invention, a cassette storage device of generally book-like shape is provided which can be stored on a bookshelf, similar to books, the titles of the cassettes being visible at portions where the back or binding of a book generally appears.

The following description of the present invention is given with respect to cassette cases of the "compact cassette" type (also known as Phillips or Norelco type cassette cases). However, it should be clear that other cases of similar or comparative construction, or of different sizes may be used. For example, Norelco manufactures mini cassette cases of substantially the same type of construction as "compact cassette" cases, and which could be equally used in devices of the present invention which are correspondingly scaled down in size to fit the mini cassette cases. Since compact cassette type cases are so widely known, a detailed description thereof is not given herein. Further, most other types of cassette cases having a base and openable door movably coupled to the base may be used, with minor consequential modifications to the storage devices being made to adapt to any constructional peculiarities of such other cassette cases, such minor modifications being within the scope of the present inventive concept, as claimed.

DETAILED DESCRIPTION

Figures 1, 1A, 2, 3, 4:
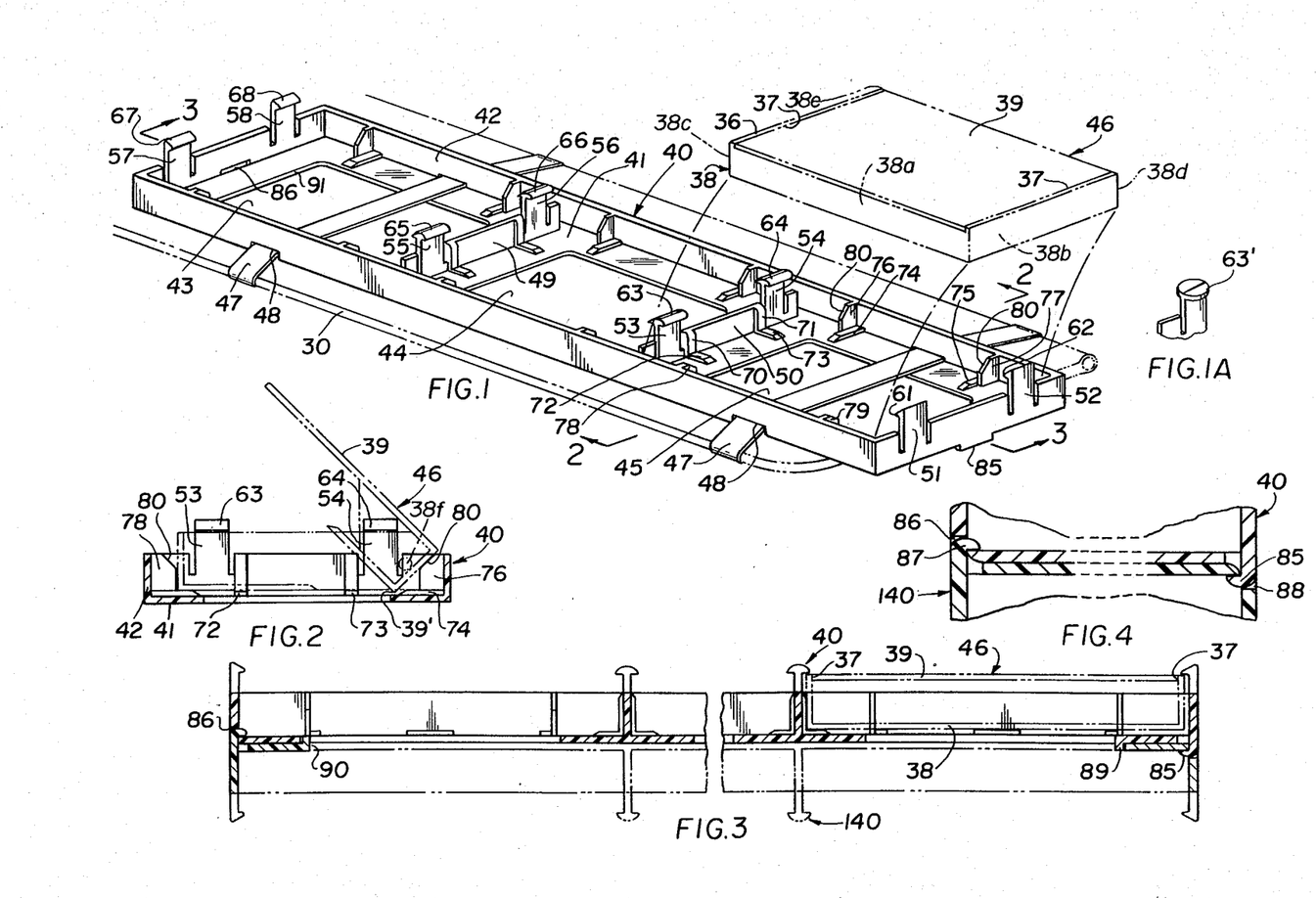
FIG. 1 is a perspective view of a cassette retaining device of the present invention which is particularly suitable for use with a sun visor of an automobile.
FIG. 1A shows a slightly modified element shown in FIG. 1.
FIG. 2 is a sectional view thereof taken along line 2—2 in FIG. 1.
FIG. 3 is a sectional view thereof taken along line 3—3 in FIG. 1.
FIG. 4 is a sectional view, similar to FIG. 3, showing two cassette carrying devices connected together in a back-to-back manner.

As noted above, the construction of compact cassette cases is widely known. Referring to FIGS. 1 and 2, one such compact cassette case is shown at 46 of type including a base portion 38 with an upstanding longitudinally extending wall 38a and first and second upstanding transversely extending walls 38b and 38c, mutually longitudinally spaced and having first ends joined to the base portion longitudinally extending wall 38a and second ends 38d and 38e, defining an upstanding longitudinally extending opening therebetween for receipt of a cover 39 for the cassette case, the transversely extending walls 38b and 38c including pivots 38f for supporting the cover for pivotal movement between open and closed positions.

Referring to FIGS. 1-4, the first embodiment of the invention intended for use with a sun visor 30 of an automobile comprises a aain body portion 40 having a base 41 and upstanding sidewalls 42 extending around the periphery of the base 41. In the embodiment shown in FIG. 1, the tape storage device 40 has three receptacles 43, 44, 45 for receiving respective compact cassette cases 46 therein. Only one such case is shown insertable in receptacle 45 in FIG. 2. Additional cases can, of course, be inserted in receptacles 43, 44 in the same manner. The storage device 40 is connected to a car visor by means of, for example, a pair of straps 47 which extend through apertures 48 in the storage device 40, and around the visor 30.

The storage device comprises separating walls 49, 50 separating the respective receptacles 43, 44 and 45. Extending upward from the walls 49, 50 are cassette case retaining members 51-58 which are integrally formed with the walls of the storage device and which are made of springy material. Preferably, the complete device is formed of a molded plastic and cut-outs are provided adjacent the springy cassette case retaining members 51-58 to increase the "spring length", and thus, the resiliency or springiness thereof. Each cassette retaining member 51-58 has a respective protrusion or projection 61-68 extending therefrom to engage the upper edge of a tape cassette storage box, such as box 46. Projections 61-68 are shown straight (i.e. squared off) in FIG. 1, but may be curved as seen at 63' in FIG. 1A. Shoulders 70, 71 projecting from wall 50 are provided to more tightly frictionally engage the sidewalls of a cassette case inserted in receptacle 45. Similar shoulders can be provided on the inner surface of the right end wall of the device, as desired. Projections 72, 73, 74 and 75, which project upwardly from the base 41 of the device, are to space the cassette case 46 from the base 41 to permit opening of the door of the cassette case 46 (FIG. 2) and also to provide a space for the straps 47 to pass through beneath the cassette cases 46 without interfering with opening of the cassette cases 46. Projections similar to projections 74, 75 are provided on the opposite side of the device (opposite to projections 74, 75), and are hidden in FIG. 1.

Ribs 76, 77, 78 and 79 are provided to frictionally engage the end vertical surfaces of the cassette case 46, and are chamfered, for example as shown at 80 to permit the door of the cassette case to open and to provide a "stop" for the door to prevent it from opening more than a predetermined amount, for example as shown in FIG. 2. The chamfered surfaces 80 serve as tapered "lead ins" to facilitate inserting a cassette case. The structure is symmetrical so that cassette cases can be reversed in direction and operate identically as shown in FIGS. 1 and 2. Shoulders similar to shoulders 70, 71, projections similar to projections 72-75 and ribs similar to ribs 76-79 are provided in cassette case receptacles 43 and 44, as shown in FIGS. 1-3. The protrusions 61-68 at the upper or free ends of retaining members 51-58 are mushroom shaped in cross-section, but other shapes could be used. Two upstanding retaining members 51-58 are shown for engaging each side of a cassette 46, but one or more than two can be so provided.

The projections 63, 64 are wide enough to project over the stationary base portion 38 of the cassette case 46, but not over the outermost edges 37 of the door portion 39 of the case 46. Alternatively, the projections 63, 64 may extend to fractionally engage or interfere with the outermost edges 37 of the door 39 to keep the case 46 more securely closed. Such fractional engagement may be, for example 0.002 to 0.007 inches. In this arrangement, curved projections as seen in FIG. 1A work better. When the cassette case is received in the storage device, the upper edge 36 of the stationary base portion 38 of the case 46 is retained under a respective pair of projections 63, 64 (the opposite edge is retained under projections 61, 62). To remove a cassette from the case, the door 39 is opened as shown in FIG. 2 so that its end wall abuts against chamfered edge 80 to limit the degree of opening of the door 39. The cassette is removed from the case, and the door can be closed. The cassette case 46 can be easily removed from the storage device by pulling same out against the resiliency of the upstanding members 51, 52, 53, 54. The above explanation has been given with respect to a cassette case stored in the receptacle 45. Similar comments apply with respect to receptacles 43 and 44.

As shown in FIGS. 3 and 4, two storage devices of the present invention can be connected back-to-back. Storage device 40 is shown as the upper storage device and storage device 140 is shown as the lower storage device. Storage devices 40 and 140 are identical, but are arranged oppositely with respect to each other as considered in the longitudinal directions thereof; that is, compartment 43 of storage device 40 will line up back-to-back with compartment 45 of storage device 140.

Referring to FIGS. 3 and 4, the storage device 40 has a projecting portion 85 at one end thereof, and a slot 86 at the opposite end thereof (see also FIG. 1). The lower storage device, which is identical to storage device 40, has the projection 87 received in the slot 86, and has a slot 88 which receives projection 85 therein. The upper storage device 40 has, in the vicinity of its projection 85, a ridge 89 extending downwardly which is received in an opening in the lower storage device 140 which is in registration therewith when the devices 40 and 140 are connected together back-to-back. Similarly, the lower storage device 140 has an upwardly extending ridge 90 in the vicinity of its projection 86 for engaging the wall 91 (see FIG. 1) when the devices are snapped together back-to-back as shown in FIGS. 3 and 4. The upwardly extending ridge 90 and the downwardly extending ridge 89 prevent the storage devices 40, 140 from becoming disengaged from each other.

As shown in FIG. 2, when the door 39 is opened, it preferably slightly engages the bottom plane of the storage device in a frictional manner. This helps retain the cover 39 in a closed condition by means of the lower corner 39' frictionally engaging the bottom plane of the storage device when the cover is attempted to be opened.

Figures 5, 6, 7, 8, 9, 10:
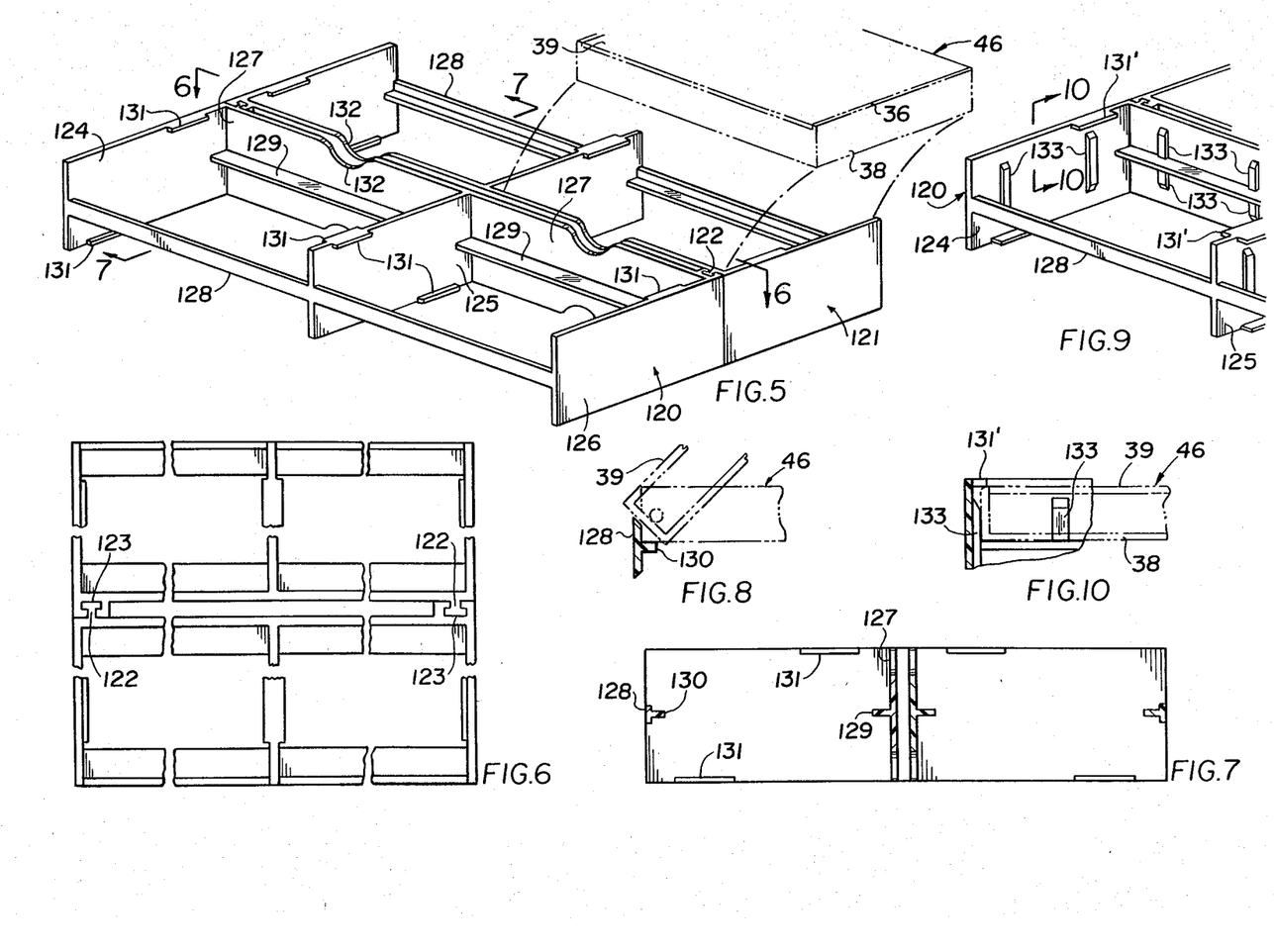
FIG. 5 is a perspective view of a second embodiment of the invention.
FIG. 6 is a sectional view thereof taken along line 6—6 in FIG. 5.
FIG. 7 is a sectional view thereof taken along line 7—7 in FIG. 5.
FIG. 8 is an exploded view illustrating how a cassette case opens when retained in the storage device of FIG. 5.
FIG. 9 illustrates a modification to the embodiment of FIG. 5.
FIG. 10 is a partial sectional view taken along line 10—10 in FIG. 9.

Referring to FIGS. 5-10, a further embodiment of the invention is illustrated. As shown in FIG. 5, this embodiment comprises first and second portions 120, 121 which are interlocked together by a T-shaped projection and mating T-shaped recess 123 formed at respective opposite ends of the sections 120, 121. In the following description, only section 120 is described in detail, since section 121 is identical, but the mirror image.

Storage section 120, which retains four cassette cases (as will become apparent) comprises first, second and third transverse walls 124, 125, 126 which are interconnected together by a longitudinal wall 127 at the rear or interior area thereof, and by means of a longitudinally extending rib 128 on the external wall thereof. The longitudinal wall 127 has a shelf-like support member 129 extending substantially perpendicularly therefrom, and the rib 128 is generally T-shaped (see FIG. 8) and has an inwardly extending shelf or support member 130 extending substantially perpendicularly therefrom. The transverse walls have projections 131 extending inwardly therefrom at the upper and lower edges thereof.

In use, a cassette case 46 is inserted into the device (as shown with respect to section 121 in FIG. 5) and when fully inserted, the cassette rests on support shelfs 129, 130, the upper edge 36 of the stationary portion 38 of the cassette being retained under respective projections 131. The cassette case is forced into the receptacle, which is permitted due to the inherent resiliency of the integrally molded plastic storage devices 120, 121. The projections 131 extend inwardly only sufficiently to project over upper wall 36, but not to project over the door member 39 of the cassette case 46, thereby permitting the door 39 to fully and easily open. Fractional engagement may be permited, as discussed hereinabove. When the door 39 is open, the rib 128 acts as a "stop" member (see FIG. 8) to limit the opening of the cover or door 39 of the case 46. This also provides a convenient pivot member about which the cover or door 39 can be turned (in the clockwise direction in FIG. 8) to force the cassette 46 out of the tape storage device of the invention. As should be apparent, two cassette cases 46 are mounted back-to-back in a given receptacle of the four-receptacle storage device shown in FIG. 5. Thus, the two-unit device shown in FIG. 5 can hold eight tape cassettes in a very compact manner, the resulting structure looking similar to a book and being mountable in, for example, a bookcase. The titles of the cassettes, visible through the back edge of the door 39, which is generally transparent, appear at the longitudinal ends of the cassette storage device. Thus, when the device is inserted in a bookcase like a book, the titles of four cassettes stored therein are visible.

The upper and lower edges of the rib 128 may be squared off as shown in FIG. 7, or may be inclined as shown in FIG. 8. The T-shaped projection 122 and mating T-shaped recess 123 extend preferably through the complete height of the respective storage sections 120, 121, so as to provide firm, frictional engagement so that the devices 120, 121 do not become inadvertently disengaged from each other. This also prevents excessive twisting motion of the device when in use. Cut-outs 132 are provided to act as finger slots to permit easier opening and removal of cassettes from the storage device.

FIGS. 9 and 10 show modified embodiments with shoulders 133 added to improve frictional engagement and retention of the cassette box 46 in the respective receptacles. When shoulders 133 are provided, projections 131' must be lengthened so as to engage over the upper edge 36 of the cassette box 46, as shown in FIG. 10. As in the embodiment of FIGS. 5-8, the projections 131' preferably do not extend over the edges of the door or cover 39, so that the door or cover can be easily opened, as desired. Fractional engagement may be permitted as discussed hereinabove with respect to FIG. 1.

Figure 11:
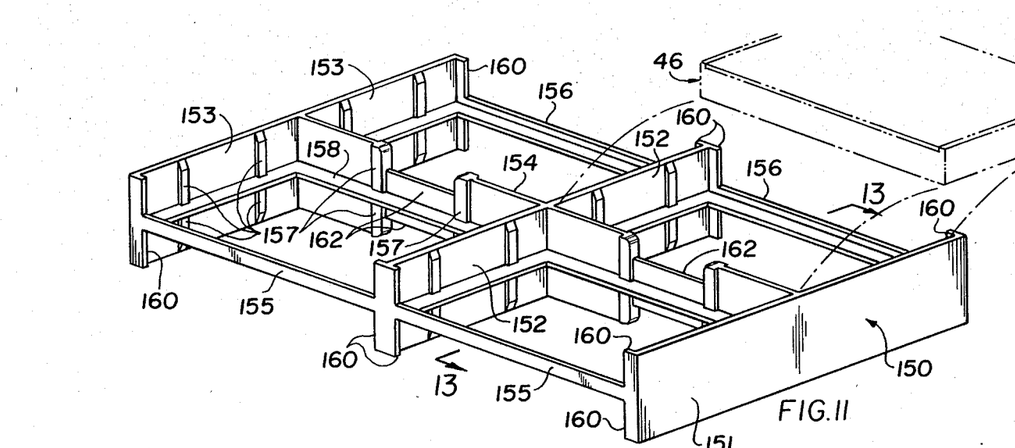
FIG. 11 illustrates a further modified embodiment of the invention.
Figure 12:
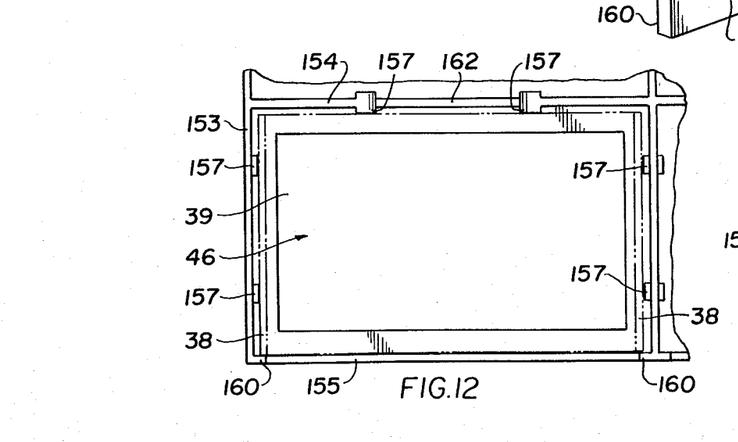
FIG. 12 is a partial plane view of the forward left cassette case receiving area in FIG. 11.
Figure 13:
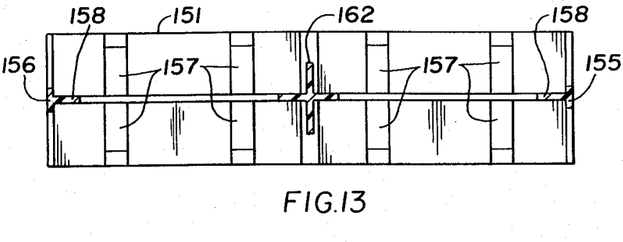
FIG. 13 is a sectional view of the embodiment of FIG. 11 taken along line 13—13 in FIG. 11.

Referring now to FIGS. 11-14, a further embodiment of the invention is a one-piece structure 150 having transverse walls 151, 152 and 153. A central longitudinal wall 154 extends between walls 150, 153, and the opposite longitudinal edges comprise longitudinal ribs 155, 156 which are substantially identical to the ribs 128 of FIG. 5. Shoulders 157 are provided (labelled only in the left forward receptacle in FIG. 11) for frictionally engaging the upstanding side walls of the stationary portion 38 of cassette box 46. A shelf-like member 158 is provided to act as a divider so that each receptacle may hold two cassette cases, back-to-back, as should be apparent. The cassette storage case 46 is inserted similarly as in the device of FIG. 5, except that it is noted that the projections 131, 131' of FIGS. 5-10 are omitted in the embodiment of FIGS. 11-13. In FIGS. 11-13, frictional engagement of the cassette case 46 with the shoulders 157 retains the cassette case in position. Edge projections 160 are provided as seen in FIG. 11 to retain a cassette in its desired relative position when the cover thereof is being opened. FIG. 12 shows a cassette case 46 retained in the receptacle by chain lines. The projections 160 extend only far enough to grip the extreme end portions, i.e., ends 38d and 38e of transverse walls 38b and 38c (FIG. 1), of the cassette case 46, but do not project over the door or cover portion 39, thereby permitting the door or cover portion to freely open without being engaged or impeded by projections 160. The projections 160 are a very important feature of this embodiment since they aid in retaining the cassette case in place while attempting to remove a cassette, and also permit free opening of the door or cover 39.

Figures 14, 15:
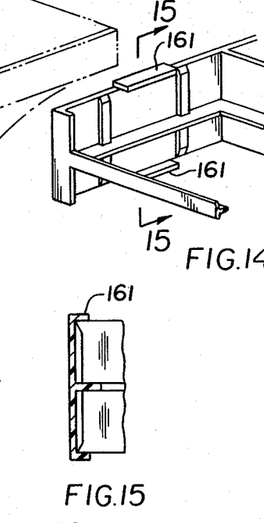
FIG. 14 is a modification to the embodiment of FIG. 11.
FIG. 15 is a sectional view taken along line 15—15 in FIG. 14.

FIGS. 14 and 15 show a modified embodiment of FIGS. 11-13, which further comprises upper projections 161 similar to projections 131 of FIG. 5, for engaging the upper surfaces 36 of the stationary portion 38 of the cassette case 46. This further aids in retaining the cassette case in place during use and storage. Due to the inherent resiliency of the plastic molded integral structure, sufficient resiliency is provided to enable the cassette case to be snapped into place over the projections 161 so as to be retained securely in the receptacle of the cassette storage device. The cassette storage device of FIGS. 11-15, like the device of FIGS. 5-10, can store eight cassettes in a book-like manner, and may be placed in a bookcase. In the embodiments of FIGS. 5-10 and 11-15, the ends or titles of the title cards in the cassette cases 14 can be seen from the end surface of the storage device (similar to the binding or "back" of a book) when the storage device is mounted in a bookshelf or is stacked. The cassette boxes can be easily opened while still retained in the storage device and the cassette tapes removed therefrom. Unless it is desired to change cassette cases in the storage device for one reason or another, it is never necessary to remove a cassette case from the cassette storage device since the cassettes are easily removable from the cases 46 without removal of the cases from the storage device.

In the embodiments of FIGS. 11–15, the ribs 155, 156 function in essentially the same manner as the ribs 128 of FIGS. 5–10, and a further description thereof is not given.

Figures 16, 17, 18, 19, 20:
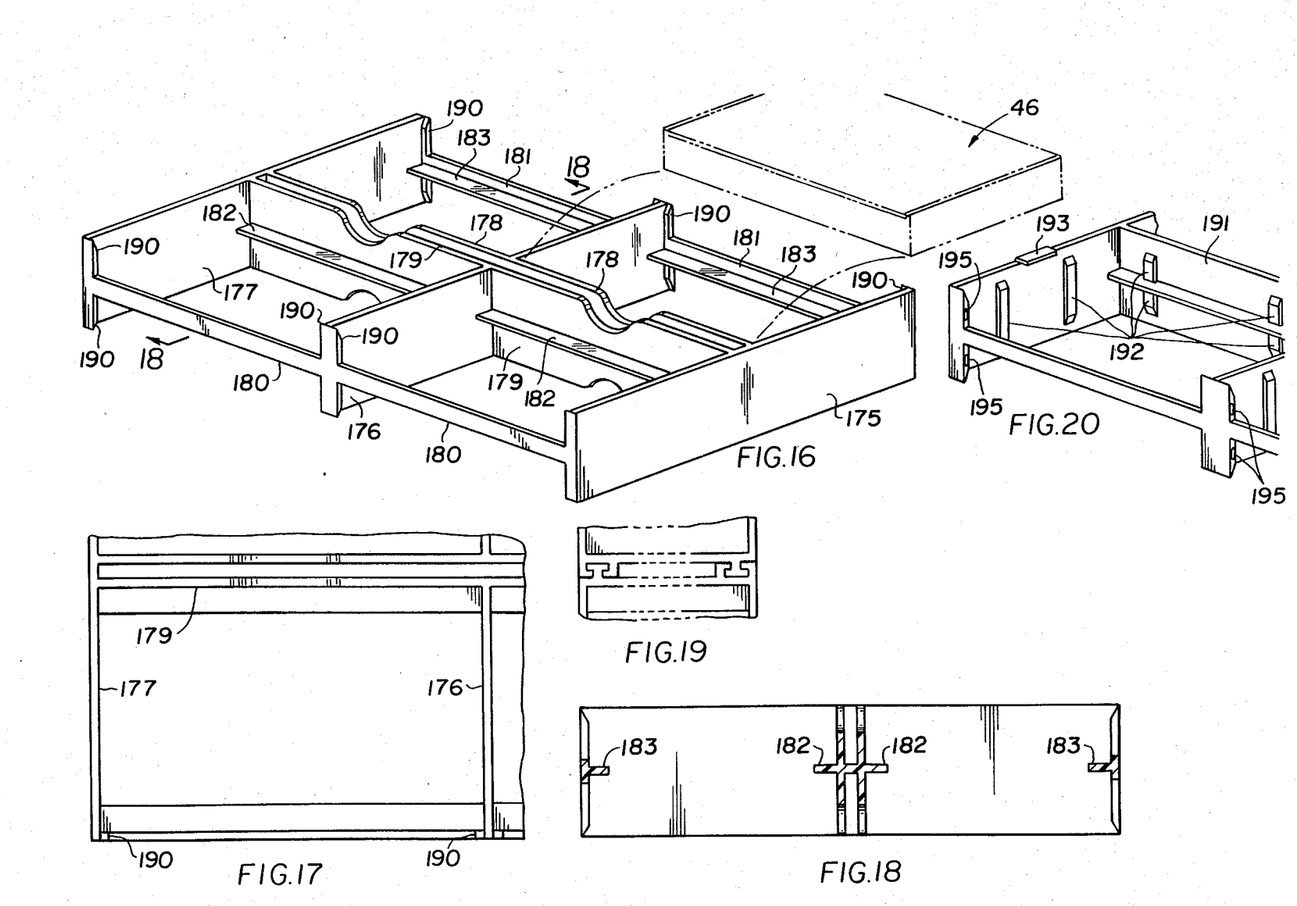
FIG. 16 is a perspective view of another embodiment of the invention.
FIG. 17 is a plan view of the forward left cassette receiving area in the embodiment of FIG. 16.
FIG. 18 is a sectional view of the embodiment of FIG. 16 taken along line 18—18.
FIG. 19 is a partial plan view of a modification to the embodiments of FIG. 16 showing how the embodiment can be made in two separate pieces, as in FIG. 15.
FIG. 20 illustrates a modification to the embodiment of FIG. 16.

FIGS. 16–20 illustrate yet another embodiment of the invention comprising transverse walls 175, 176, 177 and two central longitudinal walls 178, 179. The outer edges are defined by respective ribs 180, 181 at opposite longitudinal sides of the storage device. A shelf or central support 182 is provided on each central longitudinal wall 178, 179 and an oppositely located shelf or support 183 is provided extending from the respective ribs 180,181. See FIG. 18. In this embodiment, no shoulders 157 or upper projections 131 are provided, the only means for retaining the cassette case in place being a frictional fit of the cassette case 46 in the receptacles defined by the walls 175–177 and ribs 180, 181 of the storage device. The outer ends of the storage device are provided with projections 190 (which are similar to projections 160 of FIG. 11). The projections 190 extend only far enough to engage the thickness of the stationary portion 38 of the cassette case 46 so that the rear portion of the door 39 will clear the projections 190. The projections 190, as well as the projections 160 of the prior embodiment, should project only substantially the same distance as the thickness of the upper edge 36 of the cassette case 46. Thus, the cassette case is retained in position relatively tightly, by frictional fit, but yet the door 39 thereof is easily openable to remove the cassette therefrom, without removing the case from the storage device. The ribs 180, 181 function substantially the same as the ribs 155, 156 of FIG. 11 and ribs 128 of FIG. 5. All of these ribs may have squared off upper and lower surfaces (as shown in FIG. 18), inclined upper and lower surfaces, as shown in FIG. 8, or curved upper and lower surfaces.

The device of FIG. 16 may be formed with only a single longitudinally directed central wall replacing the two walls 178, 179, as shown in FIG. 20. Further, in the embodiment of FIG. 20, (as can also be provided in FIG. 16) the transverse walls and the single longitudinally directed central wall 191 all have shoulders 192 formed thereon for more tightly frictionally engaging the cassette 46. Since the shoulders 192 provide smaller frictional engagement surfaces with the cassette case 46, tighter frictional fit can be provided, thereby enabling looser manufacturing tolerances to be used, while still providing a satisfactory fit. The modification of FIG. 20 may also include upper projections 193 (similar to projections 131 of FIG. 5 and projections 161 of FIG. 14) to engage over the upper surface 36 of the fixed portion 38 of the cassette case 46, thereby permitting more positive engagement of the cassette case, while also permitting the door or cover 39 of the cassette case to be freely opened to remove the contents thereof.

As shown in FIG. 19, the device of FIG. 16 can be separated into two parts by means of mating T-shaped joints, in a manner substantially identical to the device of FIGS. 5–8. A detailed description of this modification is deemed unnecessary in view of the prior description of FIGS. 5–8.

As should be apparent, all of the above embodiments of the invention are preferably integrally molded of plastic material, such as impact styrene, poyethylene, polypropylene, nylon materials such as Delrin, ABS, polycarbonate or other materials having similar or suitable characteristics for the purpose. While a relatively high degree of rigidity is required, flexibility of the device is also required to permit insertion and removal of the cassette cases over the various projections and/or frictional fit portions provided.

Figure 21:
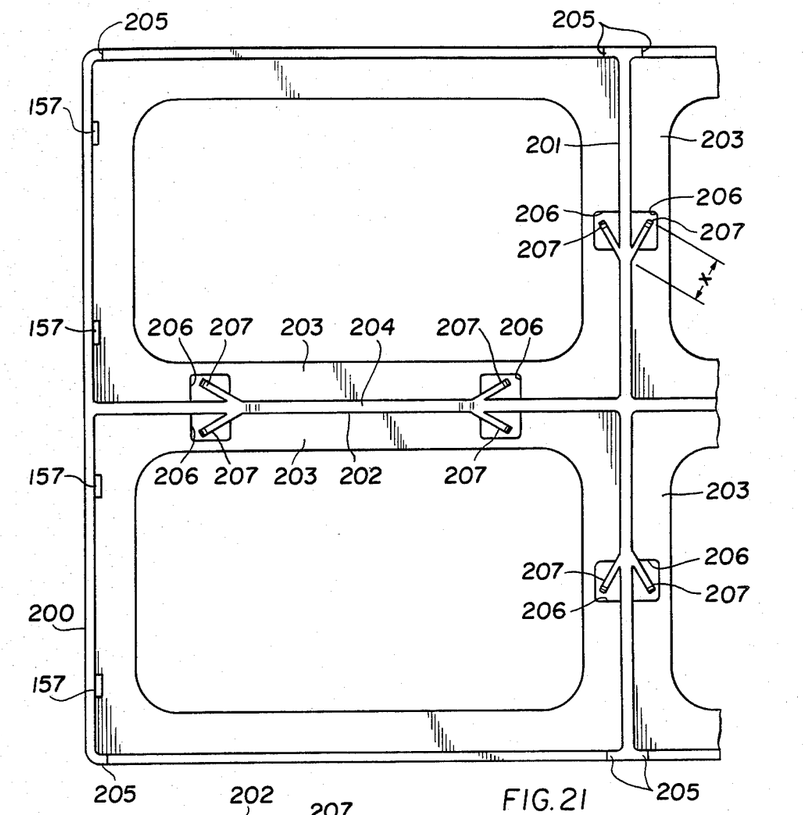
FIG. 21 illustrates a modification to the embodiment of FIG. 11.
Figure 22:
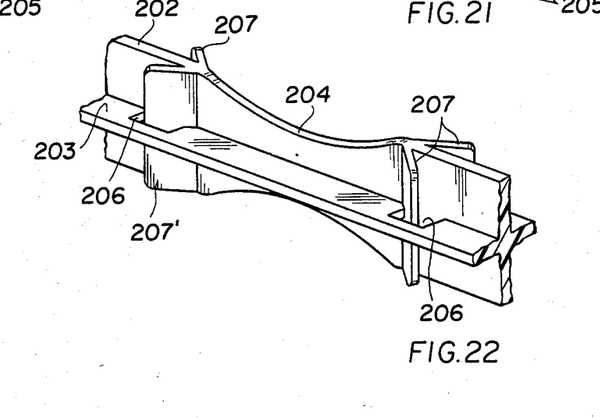
FIG. 22 illustrates a perspective view of the spring member portion of FIG. 21, drawn to a smaller scale.

FIG. 21 and 22 illustrate a further modified embodiment of the invention having spring-like members integrally molded with the storage device so as to provide a resilient engagement of the storage device with cassette cases inserted therein. The manufacturing tolerances of the cassette cases which are received in the storage devices of the present invention are not very close. Therefore, when a cassette case is grossly undersized, due to poor manufacturing control during aanufacture of the cassette case, it may not engage very tightly with the storage devices previously described since the side walls of the projections, such as projections 70, 71 of FIG. 1, 133 of FIGS. 9 and 10, 157 of FIG. 11 and 192 of FIG. 20 may not frictionally engage the sidewalls of the base portion 38 of the cassette case 46. In the embodiment of FIG. 1 such lack of frictional engagement is not critical since the overhanging projections 61–68 will grip over the top surface of the base 38 of the cassette case 46. Similarly, projections 131 of FIG. 5, 161 of FIG. 15 and 193 of FIG. 20 will provide engagement with the cassette case. In cases where the cassette case is oversized, it may possibly be very difficult to insert the cassette case into the storage device of the present invention since the vertically directed projections, such as projections 70, 71 of FIG. 1 are fixed position projections.

In order to avoid the above difficulty, the embodiment of FIGS. 21 and 22 have been developed which provides spring engagement with at least one wall of the cassette case which is to be inserted into the storage device. Preferably, as shown in FIG. 21, the spring engagement is provided against at least two walls of the inserted cassette case.

Referring now to FIGS. 21 and 22, FIG. 21 illustrates a partial top view of a cassette storage device having such spring engagement with an inserted cassette case. Preferably, the embodiment of FIG. 21 is similar in construction to that of FIG. 11, and only two back-to-back cassette receiving receptacles (to store four cassettes) are shown. In a preferred embodiment the device of FIG. 21 is configured similar to FIG. 11 to store eight cassettes, although more or less can be provided, as should be apparent. The features of the embodiments of FIGS. 21 and 22 which are identical with those of FIG. 11 are not discussed for the purpose of brevity.

The device of FIG. 21 comprises transverse walls 200, 201 which are generally similar in construction to walls 152, 153 of FIG. 11, but projections 157 are omitted in this embodiment. It should be clear that this embodiment could be modified to include projections similar to projections 157 on wall 200, as should be apparent. Due to the spring construction, such projections 157 are not required on transverse wall 201 or on longitudinal wall 202. A shelf or support projection 203 is provided to divide the receptacles so as to receive cassette cases back-to-back as in FIG. 11. Longitudinal wall 202 has a depressed area 204 therein which services as a finger gripping area to facilitate removal of cassettes from the storage device. Wall portions 205 function similarly to wall portions 160 of FIG. 11 to retain a cassette case in the storage device during opening thereof.

The shelf or support 203 has openings 206 formed therein during molding, and spring-like members 207 which are integrally formed with the respective walls 201, 202 from which they project. The device is preferably integrally molded of plastic material and spring-like members are molded sufficiently thin so that the free-end portions are resiliently movable towards the respective walls from which the spring members 207 project during insertion of a cassette into the cassette storage device. The upper and lower edges of the spring members 207 may be squared off as seen in FIG. 22, or they may be rounded as shown by the spring member 207' in FIG. 22, the rounded edges providing a better lead-in when inserting the cassette case into the storage device. The reason for the openings 206 is to permit the device to be molded without requiring a cam action mold. In a preferred arrangement, the spring members 207 have a length (designated by "x" in FIG. 21) of approximately 0.3 to 0.4 inches, and a thickness of approximately 0.30 to 0.060 inches.

In order to improve engagement and lead-in of the cassette case, ribs such as ribs 157 of FIG. 11 can be provided on wall 200 as shown in FIG. 21. Preferably, ribs 157 have inclined upper and lower end surfaces, as shown in FIG. 11, to provide better lead-in of the cassette case inserted in the cassette holder.

In all of the above described embodiments, the respective shoulders 70, 71 (FIG. 1), 133 (FIGS. 9 and 10), 157 (FIG. 11) and 192 (FIG. 20) have inclined upper and lower surfaces so as to provide a ramp-like lead-in for cassette cases inserted into the storage device. This is very advantageous and facilitates insertion of cassette cases, especially when cassette cases vary in size due to poor manufacturing tolerances thereof. Similarly, it is noted that wall portion 190 is inclined at its upper and lower edges as shown in FIG. 16 to provide lead-in for cassette cases. In a similar manner, the upper surfaces of projections 61-68 of FIG. 1 are inclined to provide lead-in for cassette cases inserted into the holder thereof. Projections, such as projections 131 of FIG. 5 may be provided in the embodiment of FIG. 21. Also, the outermost longitudinal ribs of the FIG. 21 embodiment may be shaped as shown in FIG. 11 to provide a "means" for limiting the degree of opening of the door of a cassette, and to permit viewing of the label at the end of a cassette case for identifying the contents of the cassette case.

While it is preferred that the various projections 61-68 (FIG. 1), 131 (FIG. 5), 161 (FIG. 14) and 193 (FIG. 20) extend only over the base or stationary part 38 of the cassette case 46, it is possible to have these projections extend very slightly over the edge portions 37 of the door 39 of the cassette case to further keep the door closed. This is particularly advantageous when the mechanism of the cassette case, per se, which retains the door in a closed condition, becomes worn out or broken. In this instance, the projections should preferably project over the edge 37 of the cassette case door by approximately 0.002-0.007 inches. This degree of overlap of the various projections over the edges 37 of the door 39, in combination with the resiliency of the various projection members, and the degree of curvature of projections 61-68 (FIG. 1A) enables the door 39 to be relatively easily forced passed the respective projections when being opened, but retains the door in the closed condition so that they do not inadvertently open, for example during normal handling. Since projections 160 (FIG. 11) and 190 (FIG. 16) engage a complete back surface of the base 38, it is preferable that these projections do not also engage the movable door portion since due to the large size of these projections, it will be relatively difficult to open the door. The projections of the other Figures which function like projections 61-68 of FIG. 1, may have modified curved shapes as shown in FIG. 1A. However, these projections could have button like dimples or projections extending therefrom, for example as shown in FIG. 20, to aid in retaining the cassette door closed during normal handling, the cassette door being relatively easily movable passed the buttons or projections 195 during manual opening of the cassette case.

All of the storage devices shown herein may have greater or fewer storage receptacles or compartments. For example the FIG. 1 embodiment may have one or more receptacles. With only one or two receptacles the device is small enough to clip or mount to a belt of a user for convenient tape storage when using a portable tape recorder. The other embodiment may be arranged to hold one or more (even more than eight, as shown) cassette cases, not necessarily back-to-back as shown in the drawings. One layer of cassette cases can be provided by using only the upper or lower half of the respective units.

I claim:

1. A cassette case storage device for storing a cassette (46) of type including a base portion (38) with an upstanding longitudinally extending wall (38a) and first and second upstanding transversely extending walls (38b and 38c), mutually longitudinally spaced and having first ends joined to the base portion longitudinally extending wall (38a) and second ends (38d and 38e), defining an upstanding longitudinally extending opening therebetween for receipt of a cover (39) for said cassette case, said transversely extending walls (38b and 38c) including pivots (38f) for supporting said cover for pivotal movement between open and closed positions, said storage device defining a compartment for receiving said cassette case and comprising:
   (a) storage device first and second upstanding mutually longitudinally spaced and transversely extending walls (151, 152), bounding said compartment for respective engagement with said cassette case first and second transversely extending walls (38b and 38c) for restraining movement of a received such cassette case in longitudinal direction in said storage device;
   (b) a first upstanding longitudinally extending wall (162) in said storage device bounding said compartment and extending between said storage device first and second transversely extending walls (151, 152) for engagement with said cassette case longitudinally extending wall (38a); and
   (c) a projection (160) in said storage device extending longitudinally from said storage device first transversely extending wall (151) for engagement with said second end (38d) of said cassette case first transversely extending wall (38b) for restraining a received such cassette case from movement in the transverse direction in said storage device, while not interfering with such pivotal movement of said cassette case cover.

2. The storage device claimed in claim 1 including a further such projection in said storage device extending longitudinally from said storage device second transversely extending wall (152) for engagement with said second end (38e) of said cassette case second transversely extending wall (38c).

3. The storage device claimed in claim 2 further including therein a rib (156) extending longitudinally between said projections and upstanding in height less than the height of said pivots (38f) in said cassette case first and second transversely extending walls (38b and 38c).

4. The storage device claimed in claim 1 including a further projection (161) extending longitudinally from said storage device first transversely extending wall (151) between said first and second ends thereof for engaging said first transversely extending wall (38b) of a received such cassette case and restraining movement of a received such cassette case in upstanding direction in said storage device.

5. The storage device claimed in claim 1 including a plurality of like structured such compartments, each for receiving an individual such cassette case.

6. The storage device claimed in claim 5 wherein a first such compartment is vertically above a second such compartment, said covers of cassette cases in said first and second compartments pivoting in opposite opening senses.

7. The storage device claimed in claim 1 further including resilient means (207) for effecting such restraint of movement of a received such cassette case in either or both of said longitudinal and transverse directions in said storage device.

8. In combination:
(a) a cassette case (46) of type including a base portion (38) with an upstanding longitudinally extending wall (38a) and first and second upstanding transversely extending walls (38b and 38c), mutually longitudinally spaced and having first ends joined to the base portion longitudinally extending wall (38a) and second ends (38d and 38e), defining an upstanding longitudinally extending opening therebetween for receipt of a cover (39) for said cassette case, said transversely extending walls (38b and 38c) including pivots (38f) for supporting said cover for pivotal movement between open and closed positions; and
(b) a storage device defining a compartment for receiving said cassette case and comprising:
(1) storage device first and second upstanding mutually longitudinally spaced and transversely extending walls (151, 152), bounding said compartment for respective engagement with said cassette case first and second transversely extending walls (38b and 38c) for restraining movement of a received such cassette case in longitudinal direction in said storage device;
(2) a first upstanding longitudinally extending wall (162) in said storage device bounding said compartment and extending between said storage device first and second transversely extending walls (151, 152) for engagement with said cassette case longitudinally extending wall (38a); and
(3) a projection (160) in said storage device extending longitudinally from said storage device first transversely extending wall (151) for engagement with said second end (38d) of said cassette case first transversely extending wall (38b) for restraining a received such cassette case from movement in the transverse direction in said storage device, while not interfering with such pivotal movement of said cassette case cover.

9. The invention claimed in claim 8 including a further such projection in said storage device extending longitudinally from said storage device second transversely extending wall (152) for engagement with said second end (38e) of said cassette case second transversely extending wall (38c).

10. The invention claimed in claim 9 further including in said storage device a rib (156) extending longitudinally between said projections and upstanding in height less than the height of said pivots (38f) in said cassette case first and second transversely extending walls (38b and 38c).

11. The invention claimed in claim 8 including a further projection (161) extending longitudinally from said storage device first transversely extending wall (151) between said first and second ends thereof for engaging said first transversely extending wall (38b) of a received such cassette case and restraining movement of a received such cassette case in upstanding direction in said storage device.

12. The invention claimed in claim 8 including a plurality of like structured such compartments, each for receiving an individual such cassette case.

13. The invention claimed in claim 12 wherein a first such compartment is vertically above a second such compartment, said covers of cassette cases in said first and second compartments pivoting in opposite opening senses.

14. The storage device claimed in claim 8 further including resilient means (207) for effecting such restraint of movement of a received such cassette case in either or both of said longitudinal and transverse directions in said storage device.

* * * * *